(12) United States Patent
Ralph et al.

(10) Patent No.: US 7,997,598 B2
(45) Date of Patent: Aug. 16, 2011

(54) VEHICLE SUSPENSION SYSTEM

(76) Inventors: Charles Ralph, Carole Park (AU);
Bernard J. Ralph, legal representative, Wynnum (AU); Simone F. Ralph, legal representative, Annerley (AU); Ashley Harris, Carole Park (AU)

( * ) Notice: Subject to any disclaimer, the term of this patent is extended or adjusted under 35 U.S.C. 154(b) by 0 days.

(21) Appl. No.: 12/666,822

(22) PCT Filed: Jul. 7, 2008

(86) PCT No.: PCT/AU2008/000998
§ 371 (c)(1),
(2), (4) Date: Dec. 28, 2009

(87) PCT Pub. No.: WO2009/003248
PCT Pub. Date: Jan. 8, 2009

(65) Prior Publication Data
US 2010/0213681 A1  Aug. 26, 2010

(30) Foreign Application Priority Data

Jul. 5, 2007 (AU) ................................ 2007903640

(51) Int. Cl.
*B60G 3/12* (2006.01)
*B60G 3/04* (2006.01)
(52) U.S. Cl. ... 280/124.116; 280/124.128; 280/124.148; 280/124.153; 280/124.134
(58) Field of Classification Search ........... 280/124.116, 280/124.128, 124.134, 124.148, 124.152, 280/124.153
See application file for complete search history.

(56) References Cited

U.S. PATENT DOCUMENTS

| | | | | |
|---|---|---|---|---|
| 2,153,083 A | * | 4/1939 | Griswold | 280/86.753 |
| 2,607,610 A | * | 8/1952 | Allison | 280/5.513 |
| 2,737,398 A | * | 3/1956 | Mohr | 280/124.128 |
| 3,402,783 A | * | 9/1968 | Trachte et al. | 180/360 |
| 3,586,346 A | * | 6/1971 | Sautter | 280/124.153 |
| 3,938,822 A | | 2/1976 | Guerriero | |
| 4,273,356 A | | 6/1981 | Sakata et al. | |

(Continued)

FOREIGN PATENT DOCUMENTS

DE  3622552 A1  1/1988

(Continued)

OTHER PUBLICATIONS

Ralph, Simone Francis et al: Supplementary European Search Report dated Mar. 2, 2011; EP 08 772 625.3; 8 pages.

*Primary Examiner* — Faye M. Fleming
*Assistant Examiner* — Drew Brown
(74) *Attorney, Agent, or Firm* — Schmeiser, Olsen & Watts, LLP

(57) ABSTRACT

A link arm (81) for restraining lateral movement of a pivotable vehicle suspension system (1), wherein a first end (90) of the arm (81) is pivotally connected to a wheel-mounting end of the system (1) and a second end (91) of the arm (81) is pivotally mounted to a frame of the vehicle such that the arm (81) may pivot relative to the frame in unison with the wheel-mounting end and restrain lateral movement of the system (1) relative to the frame. The first end (90) has a bearing (90) through which a pivot pin (71) extends. The second end (91) has a ball and socket joint 91 (ball joint) enabling pivoting of the arm (81) relative to the frame about more than one axis.

18 Claims, 5 Drawing Sheets

U.S. PATENT DOCUMENTS

| | | | |
|---|---|---|---|
| 4,491,341 A | 1/1985 | Maebayashi | |
| 4,537,420 A | 8/1985 | Ito et al. | |
| 4,715,615 A | 12/1987 | Kijima et al. | |
| 4,832,364 A | 5/1989 | Kikuchi et al. | |
| 4,989,894 A * | 2/1991 | Winsor et al. | 280/124.109 |
| 5,005,857 A * | 4/1991 | Camuffo | 280/124.109 |
| 5,158,320 A * | 10/1992 | Ando et al. | 280/124.142 |
| 5,823,552 A * | 10/1998 | Etnyre et al. | 280/124.179 |
| 5,938,219 A * | 8/1999 | Hayami et al. | 280/124.135 |
| 6,019,383 A | 2/2000 | Kociba et al. | |
| 6,152,467 A * | 11/2000 | Alesso et al. | 280/124.13 |
| 6,231,062 B1 * | 5/2001 | Sutton | 280/124.146 |

FOREIGN PATENT DOCUMENTS

| | | |
|---|---|---|
| DE | 3901540 | 7/1990 |
| DE | 19816804 A1 | 11/1999 |
| EP | 0070025 | 1/1983 |
| JP | 58012811 A | 1/1983 |
| JP | 61035036 | 3/1986 |
| JP | 3200413 A | 9/1991 |

* cited by examiner

VEHICLE SUSPENSION SYSTEM

TECHNICAL FIELD

One aspect of this invention relates to a method for restraining lateral movement of a pivotable suspension system of a vehicle. Another aspect of this invention relates to a vehicle suspension system restrained for lateral movement.

BACKGROUND

Many different types of suspension systems for vehicles are known. Some vehicle suspension systems, such as those that utilize a control arm for pivoting a wheel-mounting end of the arm between a raised position and lowered position relative to a frame/chassis of the vehicle, have the problem that they may undergo lateral movement when subjected to lateral forces. This is because the lateral forces must be absorbed by a bearing of the control arm. Lateral movement may cause damage to the suspension system or to the vehicle itself, or can make the ride less enjoyable and cause discomfort to the vehicle's occupant.

It is an object of the present invention to provide, inter alia, a method for restraining lateral movement of a vehicle suspension system or a vehicle suspension system restrained for lateral movement which minimizes or overcomes the problem referred to above. An alternative object is to provide the public with a useful or commercial choice.

DISCLOSURE OF INVENTION

According to a first aspect of the present invention, there is provided a vehicle suspension system comprising:

a control arm assembly comprising a frame-mounting end pivotally mountable to a frame of a vehicle and a wheel-mounting end mountable to a wheel of the vehicle, wherein the wheel-mounting end is pivotable between raised and lowered positions relative to the frame and biased to remain in the lowered position;

a shock absorber extending between the frame and the control arm assembly; and a link arm extending laterally of the control arm assembly to the frame, wherein a first end of the link arm is pivotally connected to the wheel-mounting end and a second end of the link arm is pivotally mountable to the frame such that the link arm may pivot relative to the frame in unison with the wheel-mounting end and restrain lateral movement of the wheel-mounting end relative to the frame.

According to a second aspect of the present invention, there is provided a vehicle suspension system comprising:

a control arm mount connectable to a frame of the vehicle;

a control arm assembly comprising a frame-mounting end pivotally connected to the control arm mount and a wheel-mounting end mountable to a wheel of the vehicle, wherein the wheel-mounting end is pivotable between raised and lowered positions relative to the frame;

a shock absorber extending between the ends, wherein an upper end of the shock absorber is mountable to the frame and a lower end of the shock absorber is pivotally connected to the wheel-mounting end;

a biasing member extendable between the control arm assembly and the frame, for biasing the wheel-mounting end into the lowered position; and a link assembly comprising a link mount connectable to the frame and a link arm extending laterally of the control arm assembly to the link mount, wherein a first end of the link arm is pivotally connected to the wheel-mounting end and a second end of the link arm is pivotally connected to the link mount such that the link arm may pivot relative to the frame in unison with the wheel-mounting end and restrain lateral movement of the wheel-mounting end relative to the frame.

The control arm assembly may be of any suitable size, shape and construction. The control arm assembly may comprise one or more control arms extending between the frame-mounting and wheel-mounting ends. If the control arm assembly comprises two or more control arms, then the control arms may be interconnected by way of a cross piece or brace. Preferably, the control arm assembly comprises a framework of arms resembling the shape of the letter "A", wherein a pair of control arms extends between the ends, a first cross piece extends between the control arms at the frame-mounting end and a second cross piece that is shorter than the first cross piece extends between the control arms at the wheel-mounting end. Each control arm may have a bearing at the frame-mounting end. The framework may be of tubular construction or of solid cross-section.

The control arm mount may be of any suitable size, shape and construction, and may be connectable to the frame in any suitable way. The control arm mount may be connectable to any suitable part of the frame. Preferably, the control arm mount comprises a bracket connectable to the frame and a pivot pin for pinning the bearing to the bracket. More preferably, the control arm mount comprises a frame-mounting plate connectable to the frame and a pair of brackets extending from the plate to which the bearings of the control arms are pinned.

The wheel of the vehicle may be mountable to the wheel-mounting end of the control arm assembly in any suitable way. Any suitable type of wheel may be mounted to the wheel-mounting end. Preferably, the control arm assembly comprises a stub axle mount for carrying the wheel. Any suitable type of stub axle mount may be used. Preferably, the stub axle mount extends from an end of the second cross piece such that a stub axle may properly support a wheel.

Any suitable type of shock absorber may be used. The shock absorber may be, for example, a telescopic damper and/or a spring, such as a coil spring. Preferably, the shock absorber is a telescopic damper. The upper end may be pivotally mounted to the frame and the lower end may be pivotally connected to the wheel-mounting end in any suitable way. Preferably, the upper end is pivotally mounted to the frame by way of the control arm mount, although it is to be appreciated that the upper end may be pivotally mounted to the frame independently of the control arm mount.

Preferably, the control arm mount comprises a bracket and a pivot pin for pinning the upper end of the shock absorber to that bracket. More preferably, the bracket extends from the aforementioned frame-mounting plate.

Preferably, the control arm assembly comprises a mounting bracket extending from the second cross piece and a pivot pin for pinning the lower end of the shock absorber to that bracket. Preferably, the bracket extends between the pair of control arms.

Any suitable type of biasing member may be used for biasing the wheel-mounting end into the lowered position. The biasing member may extend between the control arm assembly and the frame in any suitable way. Preferably, the biasing member extends between the wheel-mounting end and the frame. The biasing member may be a spring such as, for example, an air spring, a coil spring or a leaf spring. The biasing member may be a hydraulic or pneumatic cylinder. The biasing member may comprise one or more of the aforementioned examples. Preferably, the biasing member is an air spring whose height may be controlled by a ride height valve, and having a lower end connected to the wheel-mounting end and an upper end connected to the frame.

The control arm assembly may comprise a biasing member support (biasing member mount). The spring support is preferably located at the wheel-mounting end. The spring support may be of any suitable size, shape and construction. Preferably, the spring support is a reinforced plate extending laterally and rearwardly of the second cross piece.

The link mount may be of any suitable size, shape and construction, and may be connectable to the frame in any suitable way. Preferably, the link mount comprises a bracket connectable to the frame and to the second end of the link arm. More preferably, the link mount comprises at least one frame-mounting plate connectable to the frame and a bracket extending from the plate to which the second end of the link arm is connected.

The link arm may be of any suitable size, shape and construction, providing that it can pivot relative to the frame in unison with the wheel-mounting end so as to restrain lateral movement of the wheel-mounting end. Typically, the link arm will extend laterally of the control arm assembly and forwardly to the link mount. Preferably, when viewed in plan, the link arm has a pair of linear regions spaced apart by a bend or arcuate region.

The second end of the link arm may comprise, for example, a ball and socket joint or a thrust bearing. Preferably, the second end of the link arm comprises a ball and socket joint (ball joint) enabling pivoting of the link arm relative to the link mount about more than one axis. That is, if necessary, the link arm may rotate/swivel relative to the link mount. Preferably, a ball of the joint is located within a socket of the joint, and a shaft extending from the socket is connected to the bracket of the link mount. Preferably, the bearings of the control arms and the link arm pivot about substantially the same axis. More preferably, a common axis extends through the bearings of the control arms and a centre of the ball of the joint.

Preferably, the control arm assembly comprises a bracket extending from an end of the second cross piece, the first end of the link arm comprises a bearing such as a polymer bushing, and a pivot pin pins the bearing to that bracket.

The common axis of the link mount and control arm mount may be angled relative to the plane of the frame/chassis to allow for wheel camber.

The suspension system may be used for any suitable type of vehicle. Preferably, the vehicle is a trailer, caravan, horse float or an automobile.

Preferably, the suspension system is an independent system, but this need not be the case. The suspension system may be used with a front or rear wheel of the vehicle. The suspension system may be used in either orientation relative to the normal direction of travel of the vehicle. Preferably, the suspension system is a trailing or semi-trailing system. Suspension systems positioned in tandem or in a triple configuration may enable load sharing on independent sides of the vehicle. Systems on both sides of the vehicle may allow for ride height adjustment.

The invention also broadly relates to a link arm and a method of using that link arm to restrain particular types of vehicle suspension systems. The invention may be broadly defined as follows:

According to a third aspect of the present invention, there is provided a link arm for restraining lateral movement of a pivotable vehicle suspension system, wherein a first end of the link arm is pivotally connected to a wheel-mounting end of the system and a second end of the link arm is pivotally mounted to a frame of the vehicle such that the link arm may pivot relative to the frame in unison with the wheel-mounting end and restrain lateral movement of the system relative to the frame.

According to a fourth aspect of the present invention, there is provided a method for restraining lateral movement of a pivotable vehicle suspension system using a link arm, said method comprising the steps of:

pivotally connecting a first end of the link arm to a wheel-mounting end of the system; and pivotally mounting a second end of the link arm to a frame of the vehicle such that the link arm may pivot relative to the frame in unison with the wheel-mounting end and restrain lateral movement of the system relative to the frame.

The suspension system may resemble that described above in respect of the first and second aspects of the invention.

The link arm may also have one or more features of the link arm described above in respect of the first and second aspects.

The link arm may be retrofitted to existing vehicle suspension systems so as to further restrain lateral movement thereof.

A preferred embodiment of the invention will now be described by way of example with reference to the accompanying figures.

BEST MODE FOR CARRYING OUT THE INVENTION

Figure 1:
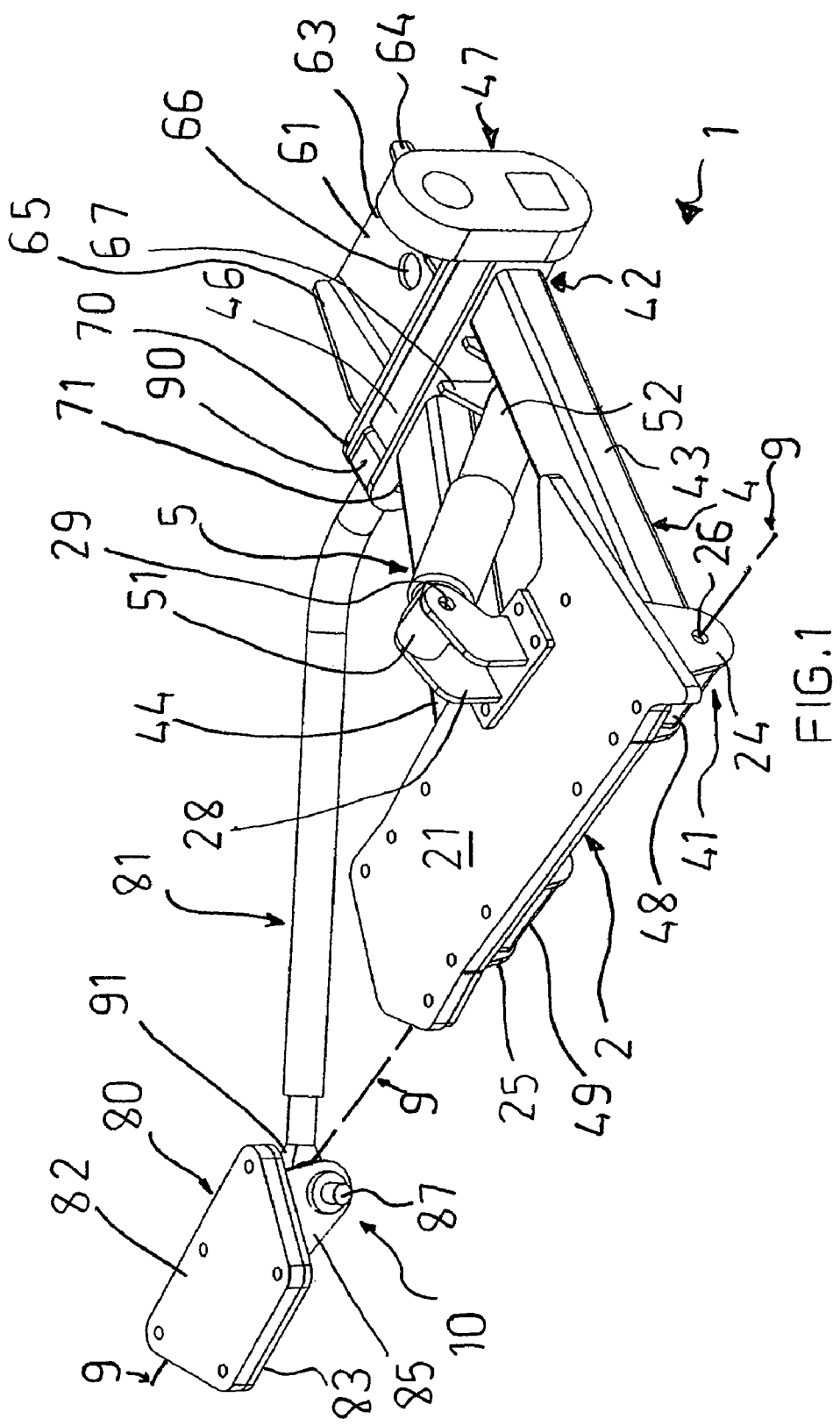
FIG. 1 is a perspective view of part of a vehicle suspension system, according to an embodiment of the present invention.

In the figures, like reference numerals refer to like features.

The figures show a suspension system 1 for a trailer, such as a horse float. The system 1 includes a control arm mount 2, a control arm assembly 4, a shock absorber 5, an air spring 6 (see FIG. 5) and a link assembly 10 (see FIGS. 1 and 2). A frame/chassis of the trailer is labeled numeral 3.

The control arm assembly 4 has a leading end 41 and a trailing end 42. The assembly 4 includes a framework of arms resembling the shape of the letter "A", wherein a pair of control arms 43, 44 extends between the leading and trailing ends 41, 42, a first cross piece 45 extends between the control arms 43, 44 at the leading end 41 and a second cross piece 46 extends between the control arms 43, 44 at the trailing end 42. The control arms 43, 44 and cross pieces 45, 46 are of tubular construction. Each control arm 43, 44 has a bearing 48, 49 containing a polymer bushing at the leading end 41. The other end of each control arm 43, 44 is connected to the second cross piece 46. The second cross piece 46 is of a composite nature, having a solid beam sandwiched between a pair of opposed plates (see FIG. 1).

The control arm assembly 4 includes a mounting bracket 67 (see FIG. 1) located between the control arms 43, 44 and extending from the second cross piece 46, and a pivot pin 60 (see FIG. 3) for pivotally connecting the shock absorber 5.

The control arm assembly 4 includes a mounting bracket 70 connected to an end of the second cross piece 46 and a pivot pin 71 (see FIG. 1) for pivotally connecting the link assembly 10.

The control arm assembly 4 includes a support 61 for supporting the spring 6. The support 61 includes a plate 63 extending laterally and rearwardly of the second cross piece 46, and a pair of gussets 64, 65 extending from the plate 63 to the second cross piece 46. The plate 63 has a centrally located opening 66.

Figure 4:
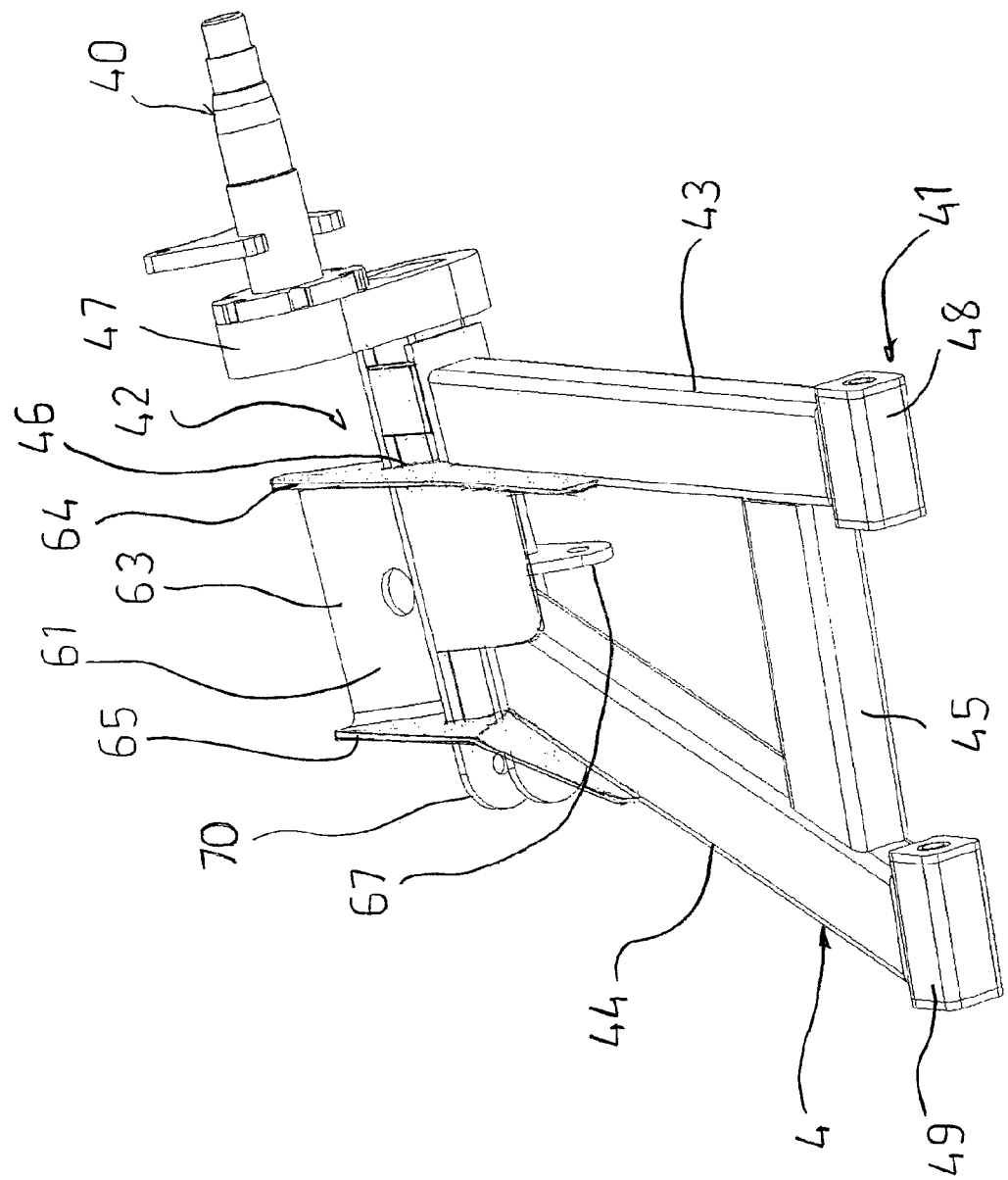
FIG. 4 is a perspective view of part of the suspension system shown in FIG. 1 and further showing a stub axle mounted thereto.
Figure 5:
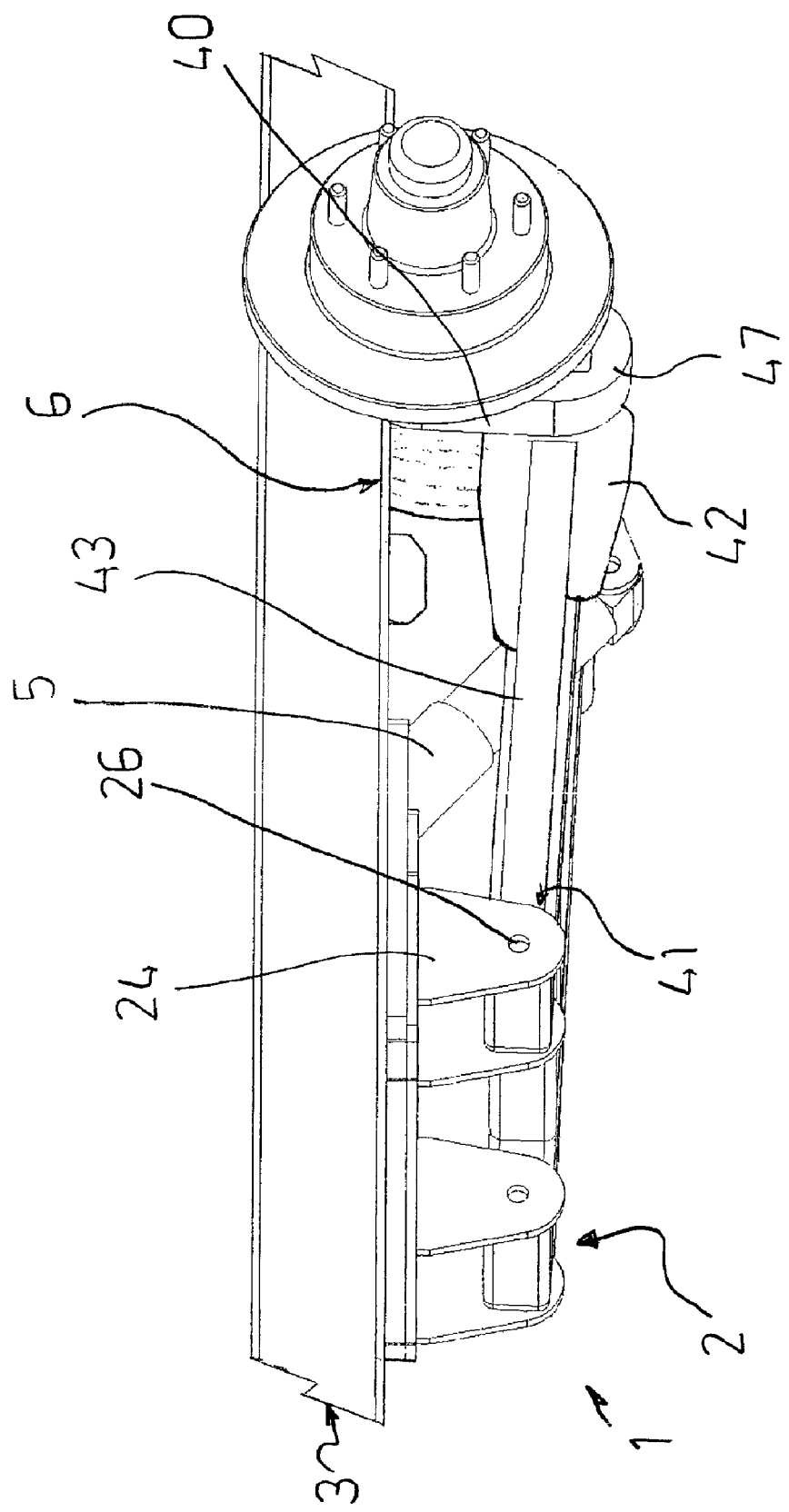
FIG. 5 is a perspective view of part of the suspension system shown in FIG. 4 but shown supporting a disk brake hub.

The control arm assembly 4 includes a stub axle mount 47 for carrying a wheel of the vehicle. The stub axle mount 47 is generally oval in shape and is connected to an end of the second cross piece 46. FIGS. 4 and 5 show how a stub axle 40 may be connected to the stub axle mount 47 using fasteners (not labeled). FIG. 5 further shows a disk brake hub mounted to the stub axle 40.

The control arm mount 2 includes a frame-mounting plate 21 connectable to the frame 3 by way of fasteners 23 (see FIG. 2), a pair of brackets 24, 25 extending from the plate 21, and a pair of pivot pins 26 (only one is shown). The bearings 48, 49 are pinned to a respective bracket 24, 25 by way of a respective pivot pin 26. The control arm mount 2 also includes a bracket 28 (see FIG. 1) and a pivot pin 29 for use in connecting the shock absorber 5. As seen in FIG. 5, the air spring 6 has a lower end extending through and retained within the opening 66 in the plate 61, and an upper end connected to the frame 3.

The shock absorber 5 is a velocity-sensitive telescopic damper having an upper end 51 pivotally connected to bracket 28 by way of pivot pin 29, and a lower end 52 pivotally connected to bracket 67 by way of pivot pin 60. The upper and lower ends 51, 52 are slidable relative to each other.

Figure 2:
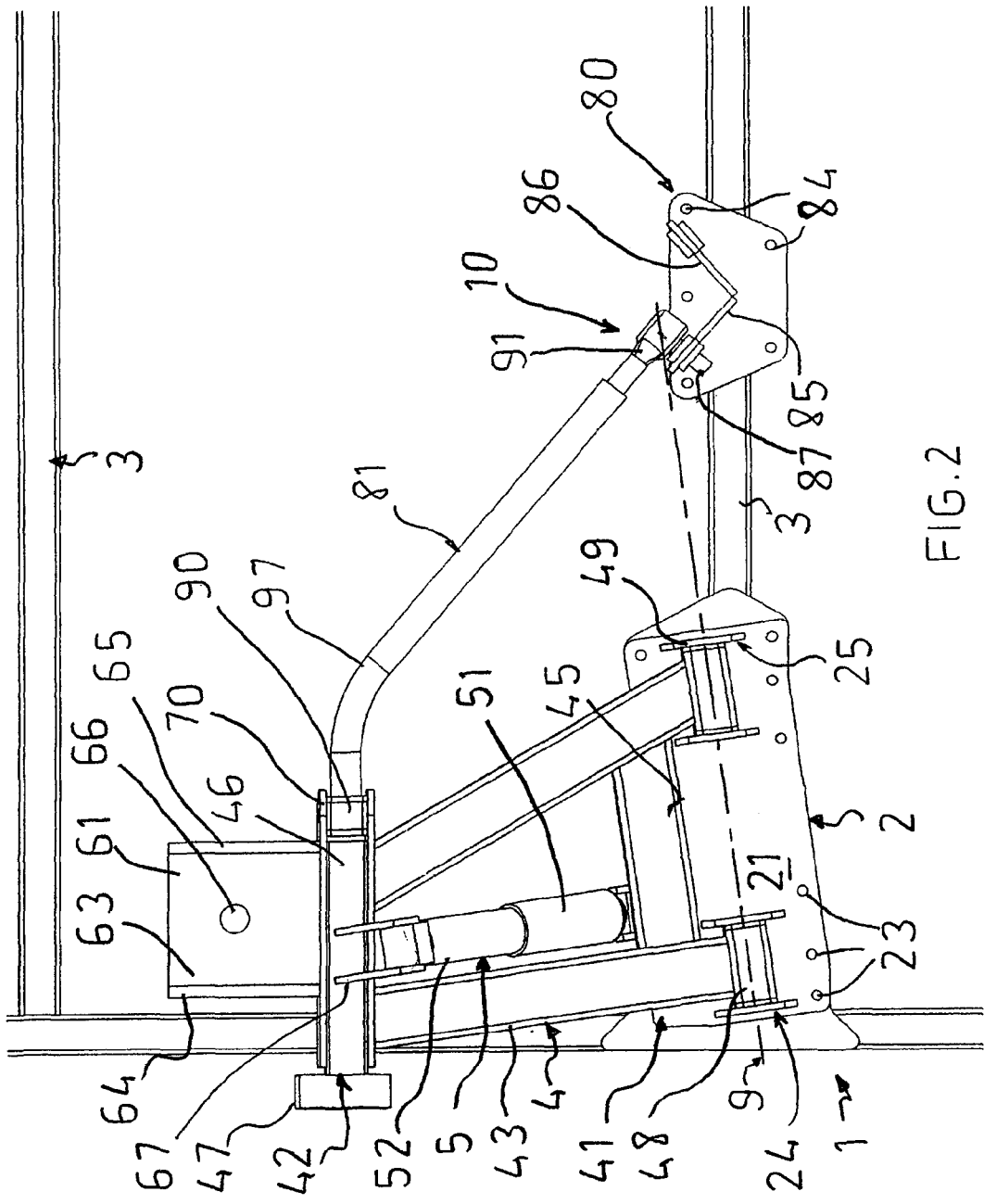
FIG. 2 is a bottom plan view of the suspension system shown in FIG. 1 when mounted to a frame/chassis of a vehicle.

The link assembly 10 includes a link mount 80 and a link arm 81, as seen in FIGS. 1 and 2. The link mount 80 includes a frame-mounting plate 82 welded to the frame 3, a further plate 83 connected to plate 82 by way of fasteners 84, and a pair of brackets 85, 86 extending from plate 83.

The link arm 81 has a first end 90 pivotally connected to bracket 70 and a second end 91 connected to bracket 85. The first and second ends 90, 91 are each located at the end of a respective linear region, said regions being interconnected by way of a bend 97. The first end 90 has a polymer bushing bearing 90 through which pivot pin 71 extends. The second end 91 has a ball and socket joint 91 (ball joint). A threaded shaft 87 extends from the socket of the joint through an opening in the bracket 85 and is connected thereto by way of a nut (not shown). The ball joint 91 enables pivoting of the link arm 81 relative to the bracket 85 about more than one axis. Bracket 86 may be used to connect to a link assembly of another suspension system like system 1.

Figure 3:
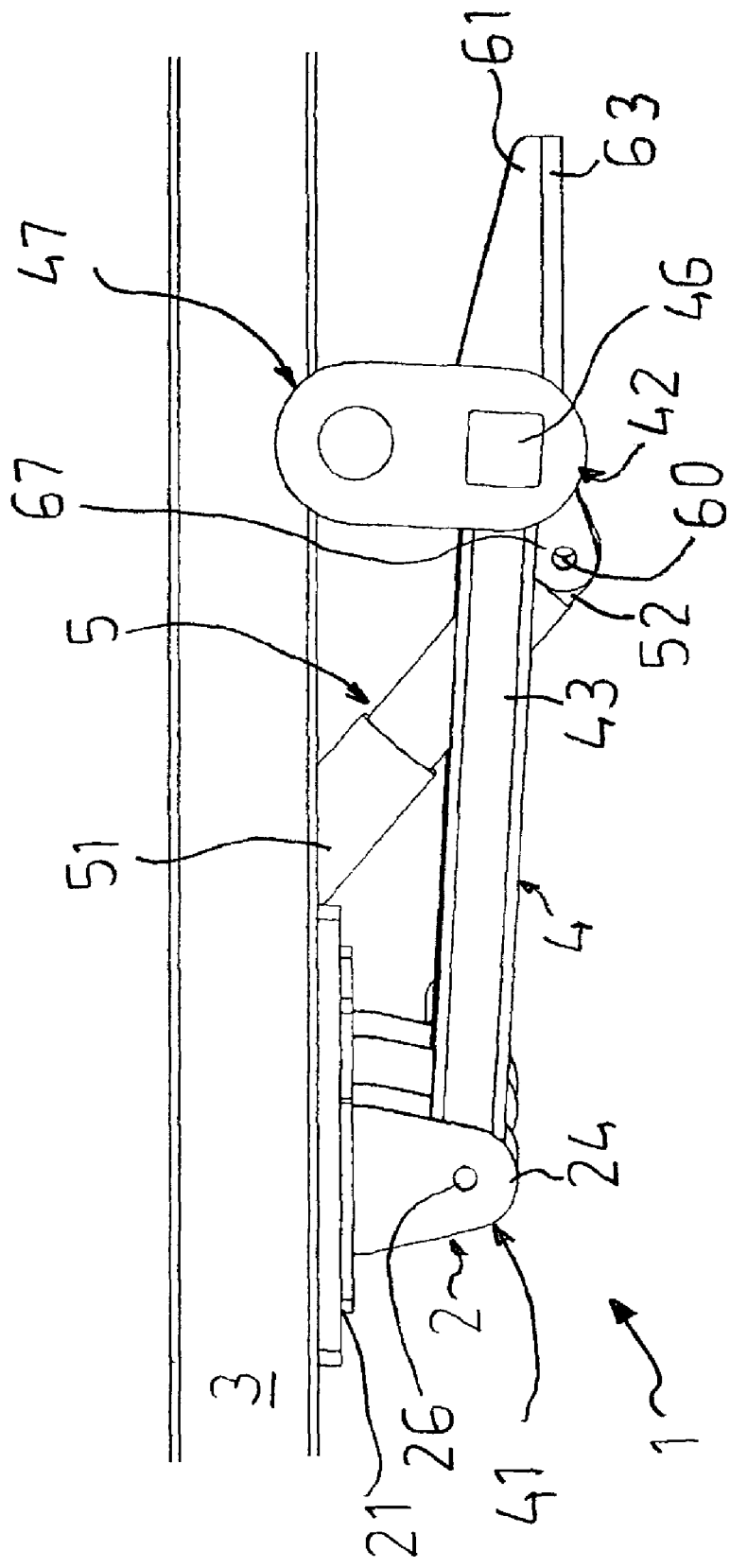
FIG. 3 is a side elevation view of the suspension system shown in FIG. 1.

In use, a pair of suspension systems 1 (and/or systems 1 in tandem or triple configuration) is mounted to the trailer. As the trailer moves over uneven ground, the trailing end 42 pivots between raised and lowered positions relative to the frame 3. The air spring 6 biases the trailing end 42 to the lowered position. FIG. 3 shows the trailing end 42 in the raised position (i.e. standard ride height neutral position) whereby the air spring 6 and shock absorber 5 are in a compressed state. FIG. 5 shows the trailing end 42 in the lowered position whereby the air spring 6 and shock absorber 5 are in a substantially uncompressed/expanded state.

The link arm 81 pivots relative to the frame 3 in unison with the trailing end 42 and assists in restraining lateral movement of the trailing end 42 relative to the frame 3. A centre of the ball of the ball joint 91 occupies the same (common) rotational axis 9 as the bearings 48, 49 of the control arm assembly 4. That is, common rotational axis 9 extends through all pivotal connection points of the bearings 48, 49 with the control arm mount 2 as well as through the pivotal connection point of the second end of the link arm 91 with the link mount 80. This means that the link arm 81 does not interfere with the geometry of the control arm assembly 1 as it travels through its operating arc and does not cause flexing of bearing or any other interference. The ball joint 91 facilitates wheel alignment. The common rotational axis 9 of the link mount 80 and control arm mount 2 can be angled relative to the plane of the frame/chassis 3 to allow for wheel camber.

Should the system 1 be subjected to a lateral force, the link arm 81 assists in restraining lateral movement of the trailing end 42 and dissipates the force more evenly throughout the frame 3/chassis. When the suspension system 1 is not subject to lateral loading, the link arm 81 provides a neutral function.

The link arm 81 can act as a sacrificial member in the event of a collision due to the retention of the degrees of freedom at the ball joint 91 and also at the bearing 90.

The air springs 6 of the system 1 pair operate independently for coordinated ride height adjustment. (Likewise, systems 1 in tandem or triple configuration may be in fluid communication with one another for load sharing on individual sides of the vehicle.)

Although the link arm 81 may appear to be somewhat similar to a conventional radius arm, a radius arm is usually used to restrain longitudinal travel as opposed to lateral travel. Also, since there is no induced axial movement or lateral stresses applied to other suspension components as the control arm assembly 4 travels through its operating arc, the link arm is therefore functionally different from a conventional panhard rod.

The suspension system 1 provides a smooth ride which will ensure that animals, such as horses, can be transported without risk of injury or discomfort during road travel.

Whilst the above has been given by way of illustrative example of the invention, many modifications and variations may be made thereto by persons skilled in the art without departing from the broad scope and ambit of the invention as herein set forth.

The term "comprise" and variants of the term such as "comprises" or "comprising" are used herein to denote the inclusion of a stated integer or stated integers but not to exclude any other integer or any other integers, unless in the context or usage an exclusive interpretation of the term is required.

The invention claimed is:

1. A link arm for restraining lateral movement of a control arm assembly of a pivotable vehicle suspension system of a vehicle wherein the control arm assembly comprises a wheel-mounting end and a frame-mounting end pivotally connected to a frame of the vehicle, wherein a first end of the link arm is pivotally connected to the wheel-mounting end and a second end of the link arm is pivotally mounted to the frame of the vehicle such that a common axis of rotation extends through all pivotal connection points of the frame-mounting end with the frame as well as through a pivotal mounting point of the second end of the link arm with the frame such that the link arm pivots relative to the frame in unison with the wheel mounting end and restrains lateral movement of the wheel-mounting end relative to the frame.

2. The link arm of claim 1, wherein when viewed in plan, the link arm comprises a pair of linear regions spaced apart by a bend or arcuate region.

3. The link arm of claim 1, wherein the second end of the link arm comprises a ball and socket joint enabling pivoting of the link arm relative to the frame about more than one axis.

4. A method for restraining lateral movement of a control arm assembly of a pivotable vehicle suspension system of a vehicle using a link arm, said method comprising the steps of:
pivotally connecting a first end of the link arm to a wheel-mounting end of the control arm assembly wherein the control arm assembly further comprises a frame-mounting end pivotally connected to a frame of the vehicle; and
pivotally mounting a second end of the link arm to the frame of the vehicle such that a common axis of rotation extends through all pivotal connection points of the frame-mounting end with the frame as well as through a pivotal mounting point of the second end of the link arm with the frame such that the link arm may pivot relative to the frame in unison with the wheel-mounting end and restrain lateral movement of the wheel-mounting end relative to the frame.

5. The method of claim 4, wherein when viewed in plan, the link arm comprises a pair of linear regions spaced apart by a bend or arcuate region.

6. The method of claim 4, wherein the second end of the link arm comprises a ball and socket joint enabling pivoting of the link arm relative to the frame about more than one axis.

7. The method of claim 4, wherein the common axis of rotation extends through two pivotal connection points of the frame-mounting end with the frame.

8. A vehicle suspension system comprising:
a control arm assembly comprising a frame-mounting end pivotally mountable to a frame of a vehicle and a wheel-mounting end mountable to a wheel of the vehicle, wherein the wheel-mounting end is pivotable between raised and lowered positions relative to the frame and biased to remain in the lowered position;
a shock absorber extending between the frame and the control arm assembly; and
a link arm extending lateral of the control arm assembly to the frame, wherein a first end of the link arm is pivotally connected to the wheel-mounting end and a second end of the link arm is pivotally mountable to the frame such that a common axis of rotation extends through all pivotal mounting points of the frame-mounting end with the frame as well as through a pivotal mounting point of the second end of the link arm with the frame such that the link arm may pivot relative to the frame in unison with the wheel-mounting end and restrain lateral movement of the wheel-mounting end relative to the frame.

9. The vehicle suspension system of claim 8, wherein when viewed in plan, the link arm comprises a pair of linear regions spaced apart by a bend or arcuate region.

10. The vehicle suspension system of claim 8, wherein the second arm of the link arm comprises a ball and socket joint enabling pivoting o the link arm relative to the frame about more than one axis.

11. The vehicle suspension system of claim 8, wherein the common axis of rotation is angled relative to a plane of the frame to allow for wheel camber.

12. The vehicle suspension system of claim 8, wherein the common axis of rotation extends through two pivotal mounting points of the frame-mounting end with the frame.

13. A vehicle suspension system comprising:
a control arm mount connectable to a frame of a vehicle;
a control arm assembly comprising a frame-mounting end pivotally connected to the control arm mount and a wheel-mounting end mountable to a wheel of the vehicle, wherein the wheel-mounting end is pivotable between raised and lowered positions relative to the frame;
a shock absorber extending between the ends, wherein an upper end of the shock absorber is pivotally connected to the wheel-mounting end;
a biasing member extendable between the control arm assembly and the frame, for biasing the wheel-mounting end into the lowered position; and
a link assembly comprising a link mount connectable to the frame and a link arm extending laterally of the control arm assembly to the link mount, wherein a first end of the link arm is pivotally connected to the wheel-mounting end and a second end of the link arm is pivotally connected to the link mount such that the link arm may pivot relative to the frame in unison with the wheel-mounting end relative to the frame, and wherein a common axis of rotation extends through all pivotal connection points of the frame-mounting end with the control arm mount as well as through a pivotal connection point of the second end of the link arm with the link mount.

14. The vehicle suspension system of claim 13, wherein the link arm extends laterally of the control arm assembly and forwardly to the link mount.

15. The vehicle suspension system of claim 13, wherein when viewed in plan, the link arm comprises a pair of linear regions spaced apart by a bend or arcuate region.

16. The vehicle suspension system of claim 13, wherein the second end of the link arm comprises a ball and socket joint enabling pivoting of the link arm relative to the link mount about more than on axis.

17. The vehicle suspension system of claim 13, wherein the common axis of rotation is angled relative to a plane of the frame to allow for wheel camber.

18. The vehicle suspension system of claim 13, wherein the common axis of rotation extends through two pivotal connection points of the frame-mounting end with the control arm mount.

* * * * *

UNITED STATES PATENT AND TRADEMARK OFFICE
CERTIFICATE OF CORRECTION

PATENT NO. : 7,997,598 B2  
APPLICATION NO. : 12/666822  
DATED : August 16, 2011  
INVENTOR(S) : Charles Ralph et al.

Page 1 of 1

It is certified that error appears in the above-identified patent and that said Letters Patent is hereby corrected as shown below:

Column 7  
Line 50, delete "second arm" and insert --second end--

Column 8  
Line 16, after "shock absorber" insert --is mountable to the frame and a lower end of the shock absorber--

Column 8  
Line 28, after "end" and before "relative" insert --and restrain lateral movement of the wheel-mounting end--

Signed and Sealed this  
Sixteenth Day of October, 2012

David J. Kappos  
*Director of the United States Patent and Trademark Office*